G. W. EMRICK.
DRILL CHUCK.
APPLICATION FILED JAN. 7, 1919.
1,364,361.
Patented Jan. 4, 1921.
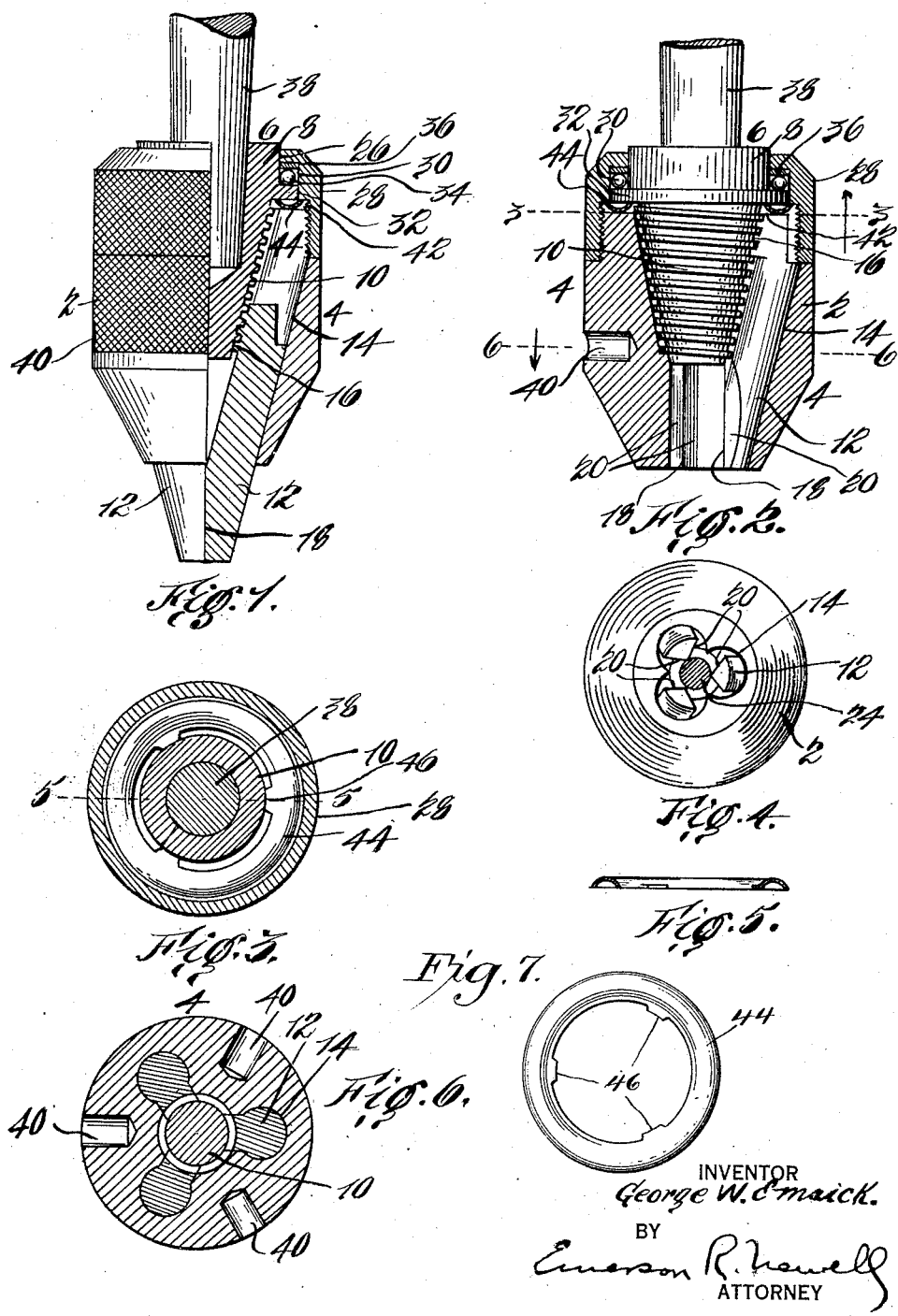

UNITED STATES PATENT OFFICE.

GEORGE WALTER EMRICK, OF BROOKLYN, NEW YORK.

DRILL-CHUCK.

1,364,361.  Specification of Letters Patent.  Patented Jan. 4, 1921.

Application filed January 7, 1919. Serial No. 270,071.

*To all whom it may concern:*

Be it known that I, GEORGE W. EMRICK, a citizen of the United States, residing at Brooklyn, in the county of Kings and State of New York, have invented certain new and useful Improvements in Drill-Chucks, of which the following is a clear, full, and exact description.

This invention relates to chucks and more particularly to drill chucks of the so-called semi-automatic type, in which the tool is automatically clamped by the clamping jaws of the chuck after the drill is started in operation, the drill chuck shown and described in this application being an improvement on the drill chuck of my Letters Patent No. 1,109,121, dated September 1, 1914.

Among the objects of my invention are the provision of a drill chuck of the semi-automatic type, in which, if occasion may require, the tool may be clamped with the same degree of tightness prior to the starting of the drill as would be accomplished by the operation of the drill itself; to provide in a chuck of this character means by which sufficient force may be manually applied to loosen the jaws of the chuck from the tool, in case they have been so tightly clamped that they cannot be loosened by the hand of the operative applied directly to the chuck itself; and to provide such means for manually tightening or loosening the chuck that no special tool is required for these operations.

A further object is to facilitate the manipulation of the chuck in the use thereof and prevent the binding or locking of the parts which control the clamping jaws by which the tool used is held and to prevent the binding or locking of the parts in such manipulation, and to cause to be imparted to said clamping jaws a slight tendency to longitudinal movement.

The invention is fully set forth in the following specification and in the claims forming part thereof, and will be fully understood by reference to said specification when taken in connection with the accompanying drawings, in which—

Figure 1 is a part sectional, part elevational view of a chuck of the class specified involving my invention and showing the clamping jaws projected so as to grasp and hold the tool.

Fig. 2, a sectional view showing the clamping jaws withdrawn into the body of the chuck.

Fig. 3, a section on the line 3—3 of Fig. 2.

Fig. 4, a bottom plan view of the chuck.

Fig. 5, a transverse section on the line 5—5 of the spring bearing of Fig. 3.

Fig. 6 is a section on the line 6—6 of Fig. 2, and Fig. 7 is a plan view of the spring.

In carrying out my invention I provide a chuck which may be similar in construction to that disclosed in my above-mentioned patent, which chuck may comprise a rotary shell portion 4 and central body portion or head 6, said head 6 comprising a cylindrical body part 8 and a conical or tapered and threaded bottom part 10. The rotary shell portion 4 carries sliding clamping jaws 12, which slide into and out of the shell portion 4, as said shell portion is rotated in one direction or the other. These jaws 12 slide in bores 14, Fig. 6, formed in the shell portion of the chuck body, said bores being three in number and arranged parallel to the conical part 10, so that as the jaws 12 move outwardly they tend to clamp a tool placed between them. From the foregoing, it will be understood the the jaws 12 revolve with the shell portion 4 and for the purpose of producing movement of said jaws into and out of the shell portion during rotation thereof, the threaded part 10, already referred to, is provided. Coöperating with the threaded part 10 are transverse threads 16 carried by the jaws 12 and these threads, as described in said patent above referred to, extend for less than a quarter the length of the jaws. The inner faces of the lower end portions of said jaws are cut away, as shown at 18 so that said faces are parallel with the central axis of the chuck body, and each of said jaws is preferably provided with two faces 20 which form a longitudinal gripping portion whereby said jaws are adapted to grasp and hold the shank 24 of a drill or other tool inserted between the same, all as described in said patent.

The central body portion or head 6 projects through a central opening 26 in the body of a cylindrical cap 28 which is in threaded engagement with the main chuck body 2. An annular chamber 30 is provided in the cap 28 and the head 6 is provided with a flange 32 which fits snugly into said chamber 30 but may rotate therein. Above the flange 32 the chamber 30 forms a ball race in which may be placed steel balls 34, and above the balls is placed a hard steel annular gasket 36 which takes up the thrust or strain in the operation of the device. The head 6 is centrally bored for the reception of a spindle or shank 38, by which the chuck is connected to the machine, this shank fitting tightly into the central bore in the head 6.

When the machine is idle, the shank or spindle 38, together with the head 6, are stationary and by rotating the shell portion 4, the jaws may be moved from the position shown in Fig. 1 toward the position shown in Fig. 2, thereby opening said jaws and permitting the insertion, therebetween, of any suitable tool, such as a drill.

It will be understood from the foregoing that not only are the jaws moved into and out of the chuck body by rotary movement of the shell portion 4, but said jaws are also movable into and out of the chuck body by a rotation of the threaded part 10. In other words any relative movement of rotation between the parts 4 and 10 will cause movement of the jaws.

In the use of a chuck as contemplated in the patent above referred to, the jaws are opened by rotating the shell portion and a tool inserted, after which the jaws are closed on the tool by grasping the shell portion and rotating it in the opposite direction. When the machine is started, the friction between the tool and the work piece tends to hold the tool from turning so that momentarily there is relative movement between the shell portion 4 and the part 10, thereby causing a slight rotation of 10 which moves the jaws to very firmly clamp the tool, thus providing a semi-automatic tool setting chuck.

In some classes of work it is often desirable to fully and completely set the jaws firmly into contact with the tool prior to the starting of the machine, and in order to make this possible, a feature of my improved chuck consists in providing holes 40 of convenient depth formed in the shell portion 4 of the chuck. These holes are symmetrically placed about the chuck body as shown in Fig. 6 and are of such size and depth as to receive any piece of wire or rod which may be handy, and which may be used as a lever to apply sufficient force to the shell portion of the chuck to produce the same degree of clamping action of the jaws as is produced by the starting of the machine.

Furthermore if in starting the machine the jaws are clamped so tightly that they cannot be unclamped by direct application of the hand to the shell 4, the holes serve as convenient means by which the jaws although automatically set, may be manually unset.

One of the most important features of my invention is the means for preventing binding of the jaws when in home position.

Between the parts 4 and 28 beneath the flange or rim 32 is an annular chamber 42, the top of which is partially formed by said flange or rim and in the operation of the chuck, as described in said patent, the jaws in their inward movement are apt to be forced into contact with the wall of said chamber formed partly by the flange or rim 32 thus causing binding or locking of the jaws so as to prevent free rotation of the shell portion of the chuck, and, in order to avoid this difficulty, I place in the chamber 42 an annular bearing 44 made of spring metal and concavo-convex in cross section, the convex side of which is directed outwardly. With this device the jaws at the limit of their inward movement will bear on the bottom surface of the bearing 44, as shown in Fig. 2, and said bearing will yield, thus obviating pressure of the jaws on the flange or rim 32. Furthermore the inner ends of the jaws will also have a slight contact with the convex surface of the bearing 44, and will thus prevent the locking or binding of the jaws at the limit of their inward movement and consequently the turning of the rotary shell portion of the chuck may be easily affected at all times.

The annular spring bearing 44 is provided at intervals, as shown in Fig. 3, with three lugs 46, the distance between which radially of said bearing being less than the greatest diameter of the conical part 10 of the part 6 at the top thereof. In assembling the parts the bearing 44 is slipped on over the conical part 10 until the lugs 46 strike the uppermost thread on said part, after which the bearing 44 may be turned and the lugs 46 brought into engagement with the thread or threads on the part 10, and the bearing 44 may be rotated until it assumes the position shown in Fig. 1. This construction also serves to center the bearing or hold it in proper position in the chamber 42.

This feature of my invention is not limited, however, to the exact form of the spring bearing 44 which I have described, all that is necessary being that this device be so made as to form a spring cushion in the chamber 42, against which the jaws will bear at their home position.

The rotary shell portion of the chuck is milled, as shown in Fig. 1, to facilitate the grasping thereof by hand, as will be understood.

Having thus described my invention, what I desire to claim and secure by Letters Patent is:

1. A chuck of the class described provided with clamping jaws movable outwardly to clamping position and inwardly to unclamping position, and a cushion bearing against which said jaws are adapted to bear in their inmost position.

2. A chuck device comprising a central member, a rotary shell member mounted thereon, longitudinally movable clamping jaws mounted between said members and operated to clamping and unclamping positions by their relative rotation, and a spring bearing against which said jaws are adapted to bear at the limit of their inward movement.

3. A chuck device comprising a central member, a rotary shell member mounted thereon, longitudinally movable clamping jaws mounted between said members and operated by relative rotation thereof, and an annular concavo-convex elastic bearing mounted between the outer portion of the central member and the inner end portions of said clamping jaws and against which said jaws are adapted to bear at the limit of their inward movement.

4. A chuck device comprising a central member having a threaded conical portion, a rotary shell member mounted on said central member, longitudinally movable clamping jaws mounted in said rotary member and in engagement with said threaded conical portion, an annular spring bearing mounted on said central member at the inner end of the threaded conical portion thereof, said bearing being provided with inwardly directed lugs which are adapted to coöperate with the threads on said conical portion to permit of the connection of said bearing with said central member and to prevent its accidental displacement.

5. A chuck device comprising a central member adapted to be connected to the machine to which the chuck is attached, a rotary shell member mounted thereon, longitudinally movable tool holding clamping jaws mounted in said shell member and operated by relative movement of the central member and the shell member so that said jaws are operated to tool clamping position by starting of the machine and to home position by movement of said rotary shell member, means forming part of said shell portion whereby said portion may be turned to firmly clamp said jaws into engagement with the tool when the machine is stationary, and a spring mounted in the chuck against which said jaws are adapted to bear when they reach home position.

Signed at New York city this 4th day of January, 1919.

GEORGE WALTER EMRICK.